United States Patent [19]

Bonee

[11] Patent Number: 5,028,272
[45] Date of Patent: Jul. 2, 1991

[54] INHIBITING LEACHING OF METALS FROM CATALYSTS AND SORBENTS AND COMPOSITIONS AND METHODS THEREFOR

[75] Inventor: Joseph C. Bonee, Fort Knox, Ky.

[73] Assignee: Ashland Oil, Inc., Ashland, Ky.

[21] Appl. No.: 104,194

[22] Filed: Oct. 2, 1987

Related U.S. Application Data

[63] Continuation of Ser. No. 907,948, Sep. 15, 1986, abandoned, which is a continuation-in-part of Ser. No. 870,853, May 30, 1986, Pat. No. 4,701,219, which is a continuation of Ser. No. 349,280, Feb. 8, 1982, abandoned.

[51] Int. Cl.$^5$ .............................................. C04B 2/02
[52] U.S. Cl. .................................. 106/792; 106/638; 210/751; 210/901; 210/912; 405/129; 423/DIG. 20
[58] Field of Search .................. 106/85, 118, 119, 900, 106/792, 795, 638; 210/667, 702, 724, 726, 751, 901, 912; 405/128, 129, 263; 502/521; 423/65-67, 140, DIG. 20

[56] References Cited

U.S. PATENT DOCUMENTS

| | | | |
|---|---|---|---|
| 2,707,171 | 4/1955 | Miller | 210/747 |
| 3,442,498 | 5/1969 | Davis | 263/53 |
| 3,586,624 | 6/1971 | Larson | 210/747 |
| 3,835,021 | 9/1974 | Lorenz et al. | 210/777 |
| 3,837,872 | 9/1974 | Conner | 106/74 |
| 3,904,498 | 9/1975 | Hesse et al. | 208/13 |
| 3,907,674 | 9/1975 | Roberts | 210/751 |
| 3,929,586 | 12/1975 | Slikkers | 203/37 |
| 3,968,036 | 7/1976 | Liles et al. | 210/631 |
| 4,018,679 | 4/1977 | Bolsing | 210/751 |
| 4,018,867 | 4/1977 | Lee | 210/751 |
| 4,028,240 | 6/1977 | Manchak, Jr. | 210/751 |
| 4,116,705 | 9/1978 | Chappell | 210/751 |
| 4,124,405 | 11/1978 | Quienot | 210/912 |
| 4,142,912 | 3/1979 | Young | 106/98 |
| 4,149,968 | 4/1979 | Kupiec et al. | 210/751 |
| 4,160,731 | 7/1979 | Doyle | 210/751 |
| 4,243,514 | 1/1981 | Bartholic | 208/91 |
| 4,268,188 | 5/1981 | Bertus et al. | 405/128 |
| 4,299,687 | 11/1981 | Myers et al. | 208/113 |
| 4,309,274 | 1/1982 | Bartholic | 208/80 |
| 4,364,773 | 12/1982 | Verronneau et al. | 210/751 |
| 4,404,105 | 9/1983 | Rysman de Lockerente | 210/710 |
| 4,432,666 | 2/1984 | Frey et al. | 210/751 |
| 4,432,890 | 2/1984 | Beck | 502/62 |
| 4,436,645 | 3/1985 | Ceaser | 210/751 |
| 4,473,477 | 9/1985 | Beall | 210/747 |
| 4,547,290 | 10/1985 | Pichat | 210/751 |
| 4,668,124 | 5/1987 | Pitts et al. | 210/751 |
| 4,701,219 | 10/1987 | Bonee | 210/912 |

OTHER PUBLICATIONS

"Recent Developments in Catalytic Cracking of Reduced Crudes", by J. R. Murphy-Katalistiks Third Annual Fluid Cat Cracking Symposium 5/26-27/82.
Davison, "Technical Service Comments on Questions Frequently Asked About Cracking Catalysts".
Davison, "Catalagram"-#58, 1979-20th Anniversary Issue-Resid Processing in the FCC with Resid Cracking Catalysts.
Davison, "Catalagram"-#62, 1981-Canadian FCC Trends in the Early 1980's-Davison Survey of Fluid Catalytic Cracking of Residuum.
Chemical Abstracts; vol. 84; No. 18; May 3, 1976; 84:126447d, "Treatment of Metal-Containing Waste Waters".

Primary Examiner—Peter Hruskoci
Attorney, Agent, or Firm—Richard C. Willson, Jr.; Stanley M. Welsh

[57] ABSTRACT

During use in hydrocarbon conversion processes, sorbents, e.g. for carbon and metals, and catalysts become contaminated with metals, e.g. heavy metals such as vanadium, nickel and sodium. Leaching of heavy metals can be sharply reduced by treatment of such spent particulate materials with alkaline earth metal compound, e.g. lime, calcium fluoride, calcium sulfate, and barium chloride. Surprisingly, calcium chloride, calcium carbonate, sodium bicarbonate are relatively ineffective.

10 Claims, 1 Drawing Sheet

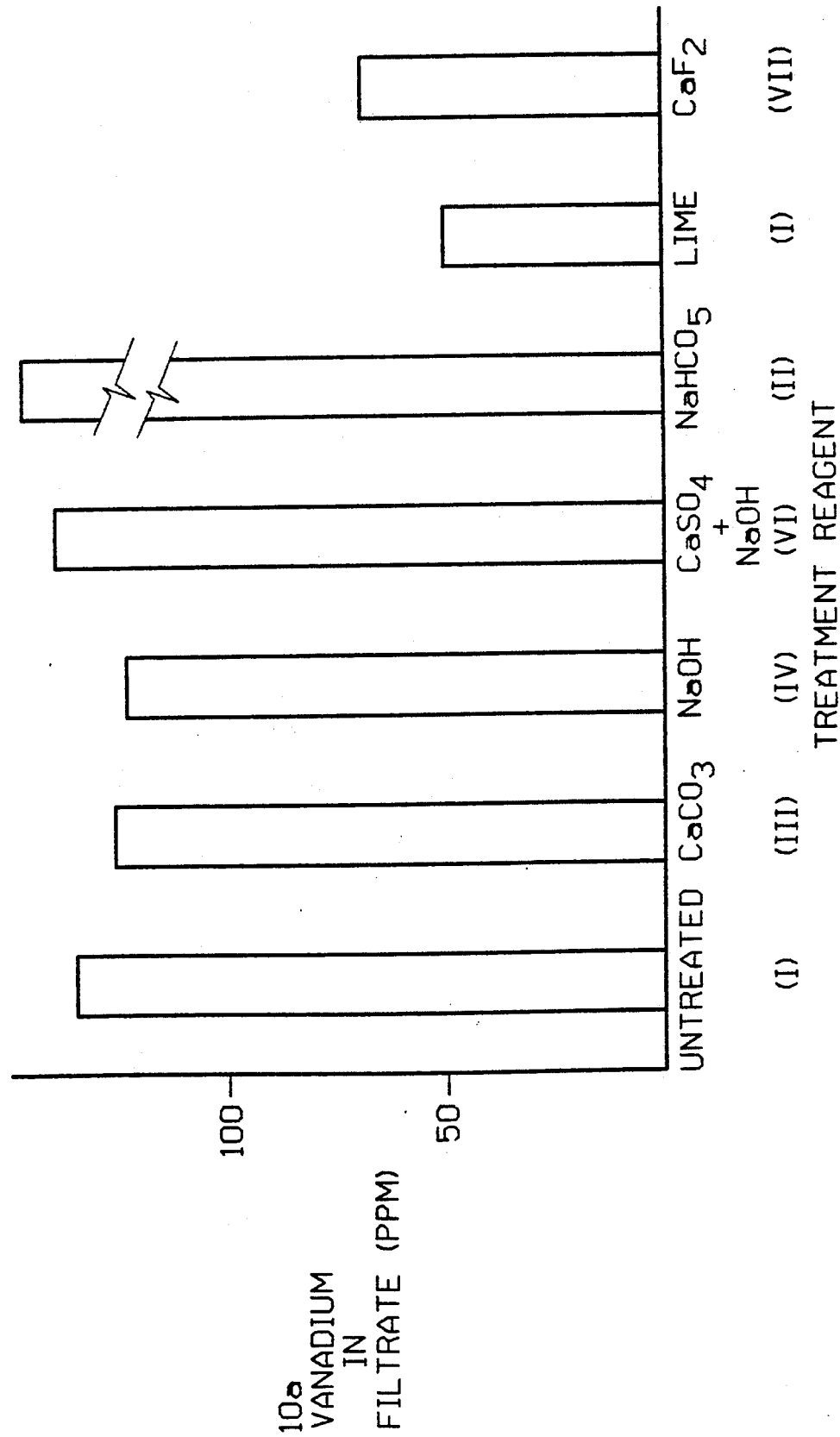

INHIBITING LEACHING OF METALS FROM CATALYSTS AND SORBENTS AND COMPOSITIONS AND METHODS THEREFOR

CROSS REFERENCES TO RELATED APPLICATIONS

The present application is a continuation of U.S. patent application Ser. No. 907,948 filed Sept. 15, 1986, now abandoned which is a continuation-in-part of U.S. patent application Ser. No. 870,653, filed May 30, 1986, now U.S. Pat. No. 4,701,219 which is in turn a continuation of U.S. patent application Ser. No. 349,280, filed Feb. 8, 1982 (now abandoned).

The present application describes the treatment of spent particulate matter used in hydrocarbon treatment processes. It relates to techniques also disclosed in U.S. patent application Ser. Nos.: 477,048 filed Mar. 21, 1983; 277,752 filed Mar. 19, 1981; and U.S. Pat. No. 4,551,231 issued Nov. 5, 1985.

BACKGROUND OF THE INVENTION

1. Field of the Invention

The invention relates to disposal in landfills of spend materials from hydrocarbon treatment processes. More particularly, this invention relates to the disposal in landfills of contaminated particulates that result from contacting hydrocarbon feeds either to produce lower molecular weight materials therefrom, or to remove at least part of the metal contaminants contained in such hydrocarbon feeds, wherein such metal contaminates include nickel, iron, or vanadium.

2. Description of the Prior Art

A variety of prior art patents have taught the immobilization of heavy metals in industrial wastes so as to make such wastes suitable for disposal in a sanitary landfill, e.g., U.S. Pat. No. 4,142,912 to Young; U.S. Pat. No. 4,268,188 to Bertus, et al; U.S. Pat. No. 4,149,968 to Kupiec, et al; and U.S. Pat. No. 3,837,872 to Connor. Bertus, et al teach the immobilization of metal contaminants in petroleum conversion or cracking catalysts by treatment of tin or indium or their compounds. Kupiec, et al teach the immobilization of heavy metals by treating alkaline slurry of waste with a mixture of bentonite clay and Portland cement.

U.S. Pat. No. 4,18,867 (1977) of T. E. Lee discloses disposal of aluminum hydrocarbyl, aluminum hydrocarbyloxy, aluminum halide, or aluminum hydride waste materials in such a way as to minimize environmental pollution when these materials are discarded in a landfill. The process involves reacting one or more of the aluminum compounds with a hydroxide or carbonate of a Group I-A, II-A, IV-A, or V-A element under substantially anhydrous conditions. The Groups are defined in Masterson, et al, "Chemical Principles," W. V. Saunders Company, Philadelphia, 1969, page 118 which corresponds to those of the 1955 Chart of Fisher Scientific Company. Anhydrous conditions are employed to avoid the formation of highly corrosive hydrolytic acid by-products and most importantly, to insure that the reaction is comparatively mild and controlled so as to avoid any danger of an explosion. The end product produced from such contacting is indicated to be highly resistant to leaching out by water and is therefore suitable for disposal in a landfill. Calcium oxide and calcium hydroxide are specifically disclosed.

U.S. Pat. No. 4,116,705 (1978) of C. L. Chappell discloses treating hazardous waste with an aluminum silicate or alumina silicate and Portland Cement in the presence of water to form a slurry and allowing the slurry to set into rock or solid crystal matrix having encapsulated therein the hazardous waste. The permeability of the material that results is less than $1 \times 10^{-4}$ centimeters per second and has a compressive strength 28 days after preparation of 100 to 1,000 PSI. Hazardous waste is disclosed especially to contain aluminum, iron, and vanadium among others. The Portland Cement used is disclosed to have an analysis of calcium oxide of 63.1%, silicone dioxide, 20.6%, alumina ($AL_2O_3$), 6.3%; iron oxide, 3.6%; and a sulfate (as $SO_4$), 42.0%.

U.S. Pat. No. 3,835,021 (1974) of W. K. Lorenz et al, discloses a process for disposing refinery waste sludge materials, which comprises dewatering and deoiling by heating to a temperature of about 100° F. and 200° F., filtering the heated material through a filter press at a temperature of about 100° F. to about 200° F., washing the resulting filter cake with water at a temperature between about 125° F. and 200° F. to obtain a filter cake which can then be spread on land to effect biodegration of the oil.

U.S. Pat. No. 3,968,036 (1976) of A. W. Liles et al, discloses a process for treating waste water which can contain a water-isoluble inorganic oxide such as a spent cracking catalyst containing vanadium, iron, nickel, copper and carbon supported on a silica-aluminum support such as a zeolite support. The invention is directed to the usefulness of adding various water-insoluble inorganic oxides to an activated sludge process so as to increase sludge settling rates, compaction as well as increase the rate which biologically oxidizable materials are removed.

U.S. Pat. No. 4,124,405 (1978) of Quienot discloses converting water-soluble pollutants into water-insoluble solid masses by treatment with a particulate metallurgical slag under alkaline conditions, in the presence of hydration-promoting agents for the slag. Examples of such agents which promote the hydration of the slag include materials containing sulfate ions and a small quantity of an alkali metal lime such as alkali metal sulfates or a mixture of gypsum and alkali metal hydroxide.

SUMMARY

General Statement of the Invention

The disposal in landfills of waste particulate matter from hydrocarbon treatment processes may be precluded by the high levels of nickel and vanadium which can be leached from these wastes by rain and ground water. The present invention immobilizes these metals, as shown by the EP Toxicity Test Procedure noted below, by the use of cheap, readily accessible alkaline earth compounds. With this procedure, the leachability of the nickel and vanadium is diminished, usually allowing a simple landfill disposal which would not otherwise be permitted.

"Hydrocarbon treatment process" means throughout the specifications and claims: either a process which converts a hydrocarbon containing feed stock into lower molecular weight species preferably in the gasoline boiling range of less than 430° F., wherein the total amount of nickel and vanadium throughout such processing on the catalyst remains below 3,000 ppm, based on the total weight of the catalyst ("FCC"-fluid catalytic cracking); or a process for producing lower molecular weight species from a hydrocarbon feed containing greater than ten parts per million (ppm) of nickel plus vanadium, and more generally, containing 25 to 100 parts per million, with a Conradson Carbon greater than two, preferably in the range of about four to eight, having 1050° F. plus content of greater than 10% and generally in the range of 20% to 40%, as based upon the total weight of the feed ("RCC"); or a process intended to remove substantial quantities of nickel and vanadium or other high molecular weight metals ("MRS"-metals removal system process) from a hydrocarbon feedstock by contact under substantially non-catalytic conversion conditions with a highly metal containing hydrocarbon feed, such as vacuum tower bottoms, or a reduced crudes.

Examples of FCC feeds are characterized as having ten or less parts per million nickel and vanadium, as based upon the total weight of feed with a Conradson Carbon of less than two with 10% or less material boiling above 1050° F. Examples of catalyst to oil ratios associated with FCC processing of the feed stocks are in the range of about 3:1 to 25:1.

Other examples of the hydrocarbon feed appropriate to this invention is one having greater than ten parts per million nickel and vanadium with a Conradson Carbon of greater than two and a hydrocarbon content which boils at above 1050° F. of greater than 10%, e.g. top crude, reduced crude, vacuum tower bottoms, and atmospheric tower bottoms. The catalyst to oil ratio suitable for conversion of this material to lower molecular weights tends to be in the range of preferably about 5:1 to 10:1.

Patents or other publications which disclose examples of hydrocarbon conversion processes defined hereinabove are the following: U.S. Pat. No. 4,432,890; Davison, Technical Services Comments on questions frequently asked about cracking catalysts; Recent Developments in Cracking Reduced Crudes by J. R. Murphy at Katalistik's Third Annual Fluid Cat Cracking Symposium held at Amsterdam, The Netherlands, May 26-27, 1982; See cite publications attached hereto.

"Conradson Carbon" means a test according to ASTM D189-81 that measures the undistillable materials that tend to form non-catalytic coke in a petroleum process, e.g. distillation, catalytic cracking, or other hydrocarbon processing.

UTILITY OF THE INVENTION

The invention converts the waste particulates from hydrocarbon treatment processes into a material which has a lower leachability of nickel and vanadium as determined by the Environmental Protection Agency's (EPA's) E.P. "Toxicity Test Procedure," Vol. 45 Federal Register No. 98, page 33,127 (May 19, 1980). Such treated waste material with high nickel and vanadium content can then be discarded in a landfill, a method of the disposal which might not be permitted had the leachability of the metals not been diminished.

"Treatment" for purposes of this specification and claims means contacting a particulate material that has been contaminated with heavy metals such as nickel and vanadium during a "hydrocarbon conversion process or hydrocarbon treatment process" with a treating agent that reacts with such metals to form a compound that is not as easily readily leachable. Many approaches to contacting are available.

For example, contacting can be the result of dry powder blending, or slurry powder blending prior to placing in a landfill.

Of perhaps still greater importance, contacting, for example, can occur after deposition in a landfill site of the contaminated particulate matter. Preferred methods for such contacting include: (A) layering contaminated particulates within or between layers that contain a treating agent so that as ground water or other leachate medium passed through a layer containing contaminated particulates it must contact a layer containing a treating agent either prior to or shortly after such movement through that layer which contains contaminated particulates; or (B) passing, through holes or shafts within a landfill site containing metal contaminated particulate matter, water slurries or solutions which contain treating agents so that prior to leaving such a site at least a portion and preferably a substantial portion in excess of 50% of such treating agents contact such contaminated particulates.

BRIEF DESCRIPTION OF THE DRAWING

The FIGURE is a bar graph of certain of the Examples, showing comparative concentration of heavy metals in leachate from the particulate material after treatment with various reagents.

DESCRIPTION OF THE PREFERRED EMBODIMENT

Starting Materials

Catalysts: The catalysts utilized with the present invention can be any of the catalysts used for hydrocarbon conversion processes or other chemical processes, e.g. silica, silica alumina, molecular sieve, etc. including without limitation those manufactured by Davison Chemical, division of W. R. Grace, by Filtrol Corporation, by Engelhard Corporation, and by UOP, Inc. among others. The catalysts may have been contaminated with heavy metals derived from the hydrocarbons or other feedstocks process by the use of the catalysts. Typical heavy metal contaminants include vanadium, nickel and sodium. The catalysts are typically of 20-400 microns (major dimension) but they may be larger or smaller and catalyst dust or fines may also be treated by the process of the invention. Processes in which such catalysts (or SORBENTS discussed below) may have been used include those described in U.S. Pat. No. 4,299,687 to Myers and Busch; U.S. Pat. No. 4,243,514 to Bartholic; and U.S. Pat. No. 4,309,274 to Bartholic.

Sorbents: Sorbents treatable by the present invention comprise those manufactured by the aforementioned catalyst companies and commonly used for removal of heavy metals from, e.g. residual fractions derived from crude oil which frequently contain objectionably high concentrations of heavy metals which must be removed to avoid poisoning of downstream hydrocarbon conversion catalysts. The size and shape of the sorbents are not narrowly critical but will generally be similar to those described above with respect to catalysts.

Contaminants: Although the invention has been tested and proven 20 particularly useful with heavy metals, e.g. V, and Ni, it will generally be useful for stabilizing certain other contaminants which may leach from spent hydrocarbon conversion, and other, catalysts and sorbents.

Treating agents: The treating agents of the present invention are carefully selected and include most preferably lime which is either slaked or unslaked, calcium fluoride, calcium sulfate, and barium chloride. By "lime" is meant the commercial form of calcium hydroxide or, in its unslaked version, the commercial form of calcium oxide. Purer calcium oxide or calcium hydroxide grades may, of course, be utilized but they would prove in most cases to be unnecessarily expensive. Calcium fluoride is more preferred among the aforementioned reagents but calcium oxide and most preferably calcium hydroxide in the form of commercial lime generally proves to be the most advantageous reagent for most applications.

Treatment Quantities: Excessive use of the reagents themselves can violate EPA regulations or fail to meet EPA standards for sanitary disposal in landfills. For this reason and for economic reasons, the concentration of treatment reagents will preferably be from 1 to 12% by weight, based on the weight of the sorbents or catalysts being treated, more preferably from 3 to about 10% on that basis and most preferably from about 4 to about 8% on the same basis.

Techniques for Treatment: The ingredients are preferably mixed as dry powders, though slurries could be employed in specialized circumstances. The dry powder, may be admixed by any conventional method, e.g. by blowing, dusting, turning in a ball mill with the balls removed, or by simply spreading the treatment reagent over a reasonably thin layer of catalyst or sorbent to be treated and then blading with a bulldozer to produce a mixing effect. After treatment, for safety reasons, a layer of at least about two feet of soil should be leveled over the deposit of treated catalyst or sorbent.

Temperatures: The temperatures will generally be ambient although materials may be slightly warmed to enhance the speed of reaction where desired.

Batch or Continuous Basis: The invention will generally be practiced on a batch of spent catalyst or sorbent received at any given time, but can, of course, be practiced continuously with spent sorbent or catalyst being continuously withdrawn and continuously treated.

EXAMPLES

Example I

Treatment of Heavy Metal Contaminated Sorbent with Lime to Reduce Leaching According to the Present Invention.

Powdered commercial unslaked lime (10 g) is added to spent sorbent (100 g) from a metal removal system (MRS) operating on reduced crude containing high levels of vanadium and nickel and mixed by mixing in a 250 ml. laboratory bottle for about two minutes. The resulting admixture is then leached with the 1600 ml of water for 24 hours according to the techniques described in the EP toxicity test mentioned above. The resulting leachate contains 55 parts per million (ppm) by weight of vanadium as compared to 135 ppm for identical leachate prepared from the same MRS sorbent without treating with lime prior to conducting the test. The leachate contains 0.1 ppm nickel as compared with 1.8 ppm nickel in the leachate prepared from the same MRS sorbent without treatment with lime.

Sodium level is reduced to 10 ppm sodium as compared to 14 ppm sodium without treatment with lime.

These results and the results of the examples which follow are tabulated in Table I.

Example II

Comparative Example Utilizing Sodium Bicarbonate in Place of Lime.

When the techniques of Example I are repeated utilizing sodium bicarbonate, NaHCO$_3$ in place of lime, the concentration of Vanadium in the filtrate is 170 ppm as compared with 55 ppm using lime on the same sorbent even though the concentration of sodium bicarbonate is 27.6% by weight based on the weight of the sorbent as compared with only 10% lime.

Example III

Using Similar Techniques, Various Other Agents are Tested in the Invention With the Results Shown in Table I.

TABLE I

| Example | Additive | Concentration of Additives (Wt %) Based on Weight of Dry Sorbent | Concentration of Metal in Filtrate (ppm) | | |
|---|---|---|---|---|---|
| | | | V | Ni | Na |
| I | None | None | 135 | 1.8 | 14 |
| II | NaHCo$_3$ | 27.6% | 170 | * | * |
| III | CaCO$_3$ | 20.6% | 123 | * | * |
| IV | NaOH | 2% | 117 | * | * |
| V | CaSO$_4$ + | 10% | 112 | * | * |
| VI | NaOH | 4.2% | 137 | * | * |
| I | Powdered Lime | 10% | 55 | 0.1 | 10 |
| VII | CaF$_2$ | 10% | 69 | 0.3 | 12 |

* Not measured as V was unacceptably high

Modifications of the Invention: While the invention is not to be considered as being limited by the above examples, they do serve to illustrate the invention to those skilled in the art who will understand that the invention is subject to a variety of modifications without departing from the spirit thereof including without limitation, use with catalysts from reactions other than hydrocarbon conversion, etc.

Specific compositions, methods, or embodiments discussed are intended to be only illustrative of the invention disclosed by this Specification. Variations on these compositions, methods, or embodiments are readily apparent to a person with skill in the art based upon the initial Specification and are therefore intended to be included as part of the inventions disclosed herein.

References to one or more patents made in this Specification is intended to result in such patents being especially incorporated herein by reference including any patents or other literature references cited within such patents.

The invention which is claimed is:

1. A process for treating contaminated particulates comprising spent catalyst from a petroleum catalytic cracking process or sorbent from a process for removing metals from residual fractions derived from crude oil having a metal selected from the group consisting of vanadium and nickel that was deposited thereon during said petroleum catalytic cracking process or said process for removing metals to substantially stabilize against leaching of said metals by rain, and groundwaters, said process comprising contacting said contaminated particulates with a treating agent selected from the group consisting of calcium fluoride, lime, and calcium hydroxide, and mixtures of two or more thereof in an amount sufficient to stabilize said metal against leaching.

2. The process of claim 1, wherein said contacting comprises mixing said particulates with said treating agent in an amount of from about 1% to about 12% by weight based on the weight of said particulates.

3. The process of claim 2, wherein said contacting is with lime that is in an amount of from about 2% to about 10% by weight based on the weight of said particulates.

4. The process of claim 2, wherein said contaminated particulates are spent catalysts from said petroleum catalytic cracking process.

5. The process of claim 2, wherein said contaminated particulates are contaminated particulate sorbents from a process designed to remove at least some heavy metals from hydrocarbon feeds.

6. The process of claim 5, wherein the treating agent consists essentially of commercial lime.

7. The process of claim 2, wherein said mixing comprises a process selected from the group consisting of: (A) forming a dry powder blend and (B) forming a slurry powder blend.

8. The process of claim 1, wherein said contacting by said treating agent is in an amount of from about 2% to about 10% by weight based on the weight of said contaminated particulates.

9. The process of claim 1, wherein said contaminated particulates are spent catalysts from a petroleum catalytic cracking that involves fluid catalytic cracking or reduced crude conversion.

10. The process of claim 1, wherein the contaminated particulates are sorbents from a process designed to remove at least some heavy metals comprising nickel and vanadium from hydrocarbon feeds.

* * * * *